(12) United States Patent
Moulton (10) Patent No.: US 10,138,131 B2
(45) Date of Patent: Nov. 27, 2018

(54) STRUCTURE DIRECTING AGENT FOR IMPROVED SYNTHESIS OF ZEOLITES

(71) Applicant: SACHEM, Inc., Austin, TX (US)

(72) Inventor: Roger Moulton, Austin, TX (US)

(73) Assignee: SACHEM, INC., Austin, TX (US)

( * ) Notice: Subject to any disclaimer, the term of this patent is extended or adjusted under 35 U.S.C. 154(b) by 32 days.

(21) Appl. No.: 15/070,023

(22) Filed: Mar. 15, 2016

(65) Prior Publication Data
US 2016/0264428 A1 Sep. 15, 2016

Related U.S. Application Data

(60) Provisional application No. 62/133,421, filed on Mar. 15, 2015.

(51) Int. Cl.
| | | |
|---|---|---|
| *C01B 39/48* | (2006.01) | |
| *B01J 29/76* | (2006.01) | |
| *B01J 37/00* | (2006.01) | |
| *B01J 37/08* | (2006.01) | |

(52) U.S. Cl.
CPC .............. *C01B 39/48* (2013.01); *B01J 29/76* (2013.01); *B01J 37/0018* (2013.01); *B01J 37/082* (2013.01)

(58) Field of Classification Search
None
See application file for complete search history.

(56) References Cited

U.S. PATENT DOCUMENTS

| | | |
|---|---|---|
| 5,958,370 A | 9/1999 | Zones et al. |
| 2008/0033225 A1 | 2/2008 | Hall et al. |
| 2015/0118150 A1 | 4/2015 | Yang et al. |
| 2016/0122192 A1 | 5/2016 | Dusselier et al. |

FOREIGN PATENT DOCUMENTS

CN  101104146 A  * 1/2008 .............. B01J 23/46

OTHER PUBLICATIONS

Wagner et al. JACS, 2000, Supplementary Information (Year: 2000).*
Nakagawa et al. (Microporous Mesoporous Materials, 22, 1989, 69-85, a reference cited by Wagner (Year: 1989).*
Translation CN 10104146.*
Manuel Moliner et al; "Cu-SSZ-39, an active and hydrothermally stable catalyst for the selective catalytic reduction of NOx", Chemical Communications, vol. 48, No. 66, Jun. 27, 2012, p. 8264.
Manuel Moliner et al; "Electronic Supplementary Information (ESI) Cu-SSZ-39, an active and hydrothermally stable catalyst for the selective catalytic reduction of NOx", Jun. 27, 2012.
Paul Wagner et al; "Guest/Host Relationships in the Synthesis of the Novel Cage-Based Zeolites SSZ-35, SSZ-36, and SSZ-39", Journal of the American Chemical Society, American Chemical Society, US, vol. 122, No. 2, Dec. 31, 1999, pp. 263-273.
Paul Wagner et al: "Guest/Host Relationships in the Synthesis of the Novel Cage-Based Zeolites SSZ-35, SSZ-36, and SSZ-39— Supplementary data: synthesis of guest molecules", Journal of the American Chemical Society, vol. 122, No. 2, Dec. 31, 1999, pp. 263-273.
PCT/US2016/022410; PCT International Search Report and Written Opinion of the International Searching Authority dated May 24, 2016.

* cited by examiner

*Primary Examiner* — Yun Qian
(74) *Attorney, Agent, or Firm* — Renner, Otto, Boisselle & Sklar, LLP (57) ABSTRACT

The present invention relates to structure directing agents for synthesis of crystalline materials generally known as zeolites, by use of an enhanced content of the trans isomer of a 3,5-dimethyl-N,N-dimethylpiperidinium cation together with the conventional oxides used to form zeolites.

8 Claims, 8 Drawing Sheets

STRUCTURE DIRECTING AGENT FOR IMPROVED SYNTHESIS OF ZEOLITES

TECHNICAL FIELD

The present invention relates to structure directing agents for synthesis of crystalline materials generally known as zeolites.

BACKGROUND

Zeolites are important crystalline materials with a broad range of applications. There is an ongoing need for improved processes for manufacturing zeolites. In one aspect, it is desirable to decrease the time necessary for reaction and calcining of the materials used in manufacturing zeolites. In another aspect, it is desirable to increase the degree of control of pore sizes in zeolites. In addition, it is desirable to better control the Si/Al ratio, and to obtain higher yields of the desired zeolite product.

U.S. Pat. No. 5,958,370, entitled Zeolite SSZ-39, provides a detailed process for making zeolites using organic structure-directing agents, referred to therein as "templates". The disclosure of U.S. Pat. No. 5,958,370 may be consulted for its teachings relating to formation of zeolites generally and to formation of zeolite SSZ-39.

SUMMARY

The zeolite SSZ-39 is a candidate for large-scale applications provided that the material can be synthesized efficiently. The synthesis is a common bottleneck hindering the exploitation of many unique zeolite topologies. SSZ-39 has been synthesized using a variety of Organic Structure Directing Agents (OSDAs). Some of the proposed OSDAs share a common feature in their chemical structure, namely, the dimethylpiperidine (lupetidine) moiety. From an economic point of view, the 3,5-lupetidine is of interest, since its pyridine precursor, known as a lutidine, are among the most common, commercially produced alkylpyridines, serving as precursors to drugs and specialty chemicals. The hydrogenation procedure (and especially the catalyst) used to convert the lutidines determines the stereochemistry of the lupetidine products. The present invention is based on the discovery that significant economic advantages can be achieved using a mixture of these organic isomers having an enhanced trans content when used to synthesize SSZ-39. The present inventor has explored the influence of structural and diastereo-isomers of lupetidine-based OSDAs on the synthesis of SSZ-39 in order to exploit this discovery.

The 3,5-dimethyl-piperidine based SDA, referred to as 3,5-dimethyl-N,N-dimethylpiperidinium has the following structures for the cis and trans isomers:

cis                              trans in which the two methyl groups on the six-membered ring may be oriented cis or trans to each other, as shown. It is noted that the six-membered ring is not a flat, two-dimensional ring, but has a three-dimensional structure of its own, as known in the art.

The zeolite Cu-SSZ-39 has been shown to be a promising catalyst for selective catalytic reduction (SCR) of nitrogen oxides in the tailpipes of diesel-fueled internal combustion engines. However, the parent zeolite H-SSZ-39 is difficult to synthesize and most of the reported recipes require many days and result in a relatively low yield of product. However the cost of its structure directing agent (SDA) is lower than the current industrially produced SCR catalyst (Cu-SSZ-13), and its thermal stability under SCR conditions is better. The cheapest and most widely available SDA for H-SSZ-39 is N,N-dimethyl-3,5-lupetidinium hydroxide (lupetidine = dimethylpiperidine). It is derived from 3,5-lupetidine, and is commercially available as a 82/18 mixture of its cis and trans isomers. The compound that is commercially available from other sources may have a slightly different mixture of the cis and trans isomers. In one embodiment, the commercially available N,N-dimethyl-3,5-lupetidinium compound contains a ratio of the trans isomer to the cis isomer in the range from about 15:85 to about 25:75.

The present inventor has discovered that, in one embodiment, by selective use of the trans isomer of 3,5-dimethyl-N,N-dimethylpiperidinium hydroxide, or of a mixture of cis and trans isomers with an enhanced content of the trans isomer, the time required to form desirable zeolites can be significantly reduced. In one embodiment, an improved zeolite product can be obtained by selective use of the trans isomer of 3,5-dimethyl-N,N-dimethylpiperidinium hydroxide, or of a mixture of cis and trans isomers with an enhanced content of the trans isomer. In addition, in another embodiment, by use of the trans isomer or a mixture of cis and trans isomer with an enhanced trans content, the desirable zeolites can be produced in a higher yield. In addition, in another embodiment, by use of the trans isomer or a mixture of cis and trans isomer with an enhanced trans content, the desirable zeolites can be produced with better control of the ratio of silicon (Si) to aluminum (Al) in the zeolite. In other embodiments, combinations of these benefits are obtained together. I.e., in one embodiment both a reduced reaction time and a higher yield are obtained. In one embodiment, both a reduced reaction time and better control of the Si/Al ratio are obtained. In one embodiment, both a higher yield and better control of the Si/Al ratio are obtained. In one embodiment, all of a reduced reaction time, a higher yield and better control of the Si/Al ratio are obtained.

Higher levels of the trans isomer can be produced at a modest increase in cost, by using specialized hydrogenation methods. In the following embodiment, it is demonstrated that H-SSZ-39 synthesis in the presence of enhanced concentrations of the trans isomer improve the kinetics and yield of H-SSZ-39, thereby reducing its cost of manufacture. There is also evidence the Si/Al ratio of the product is increased, which imparts increased longevity as an SCR catalyst.

In one embodiment, the present invention relates to a method of preparing a zeolite, comprising:
  providing a structure-directing agent comprising a first mixture of cis isomer and trans isomer of 3,5-dimethyl-N,N-dimethylpiperidinium cation;
  treating the first mixture of the cis isomer and the trans isomer of the 3,5-dimethyl-N,N-dimethylpiperidinium cation to obtain a second mixture of the cis isomer and the trans isomer of the 3,5-dimethyl-N,N-dimethylpiperidinium cation having an increased content of the trans isomer;

contacting under crystallization conditions an intermediate mixture comprising sources of oxides of silicon and of aluminum and a structure-directing agent comprising the second mixture of the cis isomer and the trans isomer of the 3,5-dimethyl-N,N-dimethylpiperidinium cation; and calcining the intermediate mixture to form a zeolite.

In another embodiment, the present invention relates to a method of preparing a crystalline material comprising oxides of silicon and of aluminum and having, after calcination, a zeolite structure, said method comprising:

providing a structure-directing agent comprising a first mixture of cis isomer and trans isomer of 3,5-dimethyl-N,N-dimethylpiperidinium cation;

treating the first mixture of the cis isomer and the trans isomer of the 3,5-dimethyl-N,N-dimethylpiperidinium cation to obtain a second mixture of the cis isomer and the trans isomer of the 3,5-dimethyl-N,N-dimethylpiperidinium cation having an enhanced content of the trans isomer;

contacting under crystallization conditions an intermediate mixture of the sources of oxides of silicon and of aluminum and a structure-directing agent comprising the second mixture of the cis isomer and the trans isomer of the 3,5-dimethyl-N,N-dimethylpiperidinium cation; and calcining the intermediate mixture to form the crystalline material having a zeolite structure.

In one embodiment, the present invention relates to a method of preparing a zeolite, comprising:

contacting under crystallization conditions an intermediate mixture of sources of oxides of silicon and of aluminum and a structure-directing agent comprising a mixture of cis isomer and trans isomer of 3,5-dimethyl-N,N-dimethylpiperidinium cation wherein the mixture comprises an increased content of the trans isomer relative to a commercially available mixture of the cis isomer and the trans isomer of the 3,5-dimethyl-N,N-dimethylpiperidinium cation, wherein the commercially available mixture contains a ratio of the trans isomer to the cis isomer in the range from about 15:85 to about 25:75; and calcining the intermediate mixture to form a zeolite.

In another embodiment, the present invention relates to a method of preparing a crystalline material comprising oxides of silicon and of aluminum and having, after calcination, a zeolite structure, said method comprising:

contacting under crystallization conditions an intermediate mixture of sources of said oxides and an organic structure-directing agent comprising a mixture of cis isomer and trans isomer of 3,5-dimethyl-N,N-dimethylpiperidinium cation wherein the mixture comprises an increased content of the trans isomer relative to a commercially available mixture of the cis isomer and the trans isomer of the 3,5-dimethyl-N,N-dimethylpiperidinium cation, wherein the commercially available mixture contains a ratio of the trans isomer to the cis isomer in the range from about 15:85 to about 25:75; and calcining the intermediate mixture to form the crystalline material having a zeolite structure.

In one embodiment, the present invention relates to a method of preparing a zeolite, comprising:

providing a precursor to 3,5-dimethyl-N,N-dimethylpiperidinium cation;

treating the precursor to provide an intermediate that, when subsequently treated to form the 3,5-dimethyl-N,N-dimethylpiperidinium cation, has a content of trans isomer of the 3,5-dimethyl-N,N-dimethylpiperidinium cation in a ratio of about 1:3 or higher to cis isomer of the 3,5-dimethyl-N,N-dimethylpiperidinium cation;

contacting under crystallization conditions an intermediate mixture of sources of oxides of silicon and of aluminum and a structure-directing agent comprising the 3,5-dimethyl-N,N-dimethylpiperidinium cation having the content of the trans isomer of the 3,5-dimethyl-N,N-dimethylpiperidinium cation in the ratio of about 1:3 or higher to the cis isomer of the 3,5-dimethyl-N,N-dimethylpiperidinium cation; and calcining the intermediate mixture to form a zeolite.

In another embodiment, the present invention relates to a method of preparing a crystalline material comprising oxides of silicon and of aluminum and having, after calcination, a zeolite structure, said method comprising:

providing a precursor to 3,5-dimethyl-N,N-dimethylpiperidinium cation;

treating the precursor to provide an intermediate that, when subsequently treated to form the 3,5-dimethyl-N,N-dimethylpiperidinium cation, has a content of trans isomer of the 3,5-dimethyl-N,N-dimethylpiperidinium cation in a ratio of about 1:3 or higher to cis isomer of the 3,5-dimethyl-N,N-dimethylpiperidinium cation;

contacting under crystallization conditions an intermediate mixture of the sources of oxides of silicon and of aluminum and a structure-directing agent comprising the 3,5-dimethyl-N,N-dimethylpiperidinium cation having a content of the trans isomer of the 3,5-dimethyl-N,N-dimethylpiperidinium cation in a ratio of about 1:3 or higher to the cis isomer of the 3,5-dimethyl-N,N-dimethylpiperidinium cation; and calcining the intermediate mixture to form the crystalline material having a zeolite structure.

In one embodiment, the zeolite is SSZ-39. In one embodiment, the crystalline material is SSZ-39.

In one embodiment, the treating comprises separating the cis isomer and the trans isomer.

In one embodiment, the 3,5-dimethyl-N,N-dimethylpiperidinium cation is paired with a hydroxide anion.

In one embodiment, the precursor is 3,5-dimethyl pyridine, or N-methyl-3,5-dimethylpiperidine or 3,5-dimethylpiperidine.

In one embodiment, the treating comprises one or more of chemical reduction, non-catalytic hydrogenation (e.g., using NaH, NaBH$_4$, formic acid, etc.), catalytic hydrogenation in the absence of water, selective crystallization, and distillation.

The commercially available 3,5-dimethyl-N,N-dimethylpiperidinium hydroxide or salt contains about 80% cis isomer.

In one embodiment the ratio of the trans isomer to the cis isomer in the trans-enhanced material is at least 30:70. In one embodiment, the ratio of the trans isomer to the cis isomer in the trans-enhanced material is at least 40:60. In one embodiment, the ratio of the trans isomer to the cis isomer in the trans-enhanced material in the trans-enhanced material is at least 60:40. In one embodiment, the ratio of the trans isomer to the cis isomer in the trans-enhanced material is about 77:23, in one embodiment, about 80:20, and in another embodiment, the ratio of the trans isomer to the cis isomer in the trans-enhanced material is in the range from about 50:50 to about 80:20. In general, the higher the trans content, the faster the reaction proceeds, the higher the yield of zeolite product, e.g., SSZ-39, and the better the control of the content of aluminum in the zeolite product.

BRIEF DESCRIPTION OF THE DRAWINGS

FIG. 7A is the $^{27}Al$ MAS NMR of calcined SSZ-39s made with different isomer

OSDA mixtures.

It should be appreciated that the process steps and structures described herein may not provide a complete system or process flow for carrying out a process for preparing a zeolite or crystalline material containing oxides of silicon and aluminum and having, after calcination, a zeolite structure, such as would be used in a commercial process for making these products. The present invention may be practiced in conjunction with techniques and apparatus currently used in the art, and only so much of the commonly practiced materials, apparatus and process steps are included as are necessary for an understanding of the present invention.

DETAILED DESCRIPTION

In accordance with the present invention, a method of preparing a crystalline material having a zeolite structure, i.e., a zeolite, is provided, in which as a result of the organic structure-directing agent prepared in accordance with the present invention, the method is improved in one or more of speed, cost, efficiency, product yield, control of aluminum content and/or the Al/Si ratio, and selectability of pore size of the resulting zeolite. In various embodiments, each one of these improved characteristics is found, alone or in any combination.

In one embodiment, separation of trans and cis isomers can be done on the final product salt, the secondary amine or the tertiary amine intermediate: N-methyl -3,5-dimethylpiperidine. In one embodiment, the separation is carried out by distillation and in another embodiment, by crystallization. Any known method for separating trans and cis isomers may be suitable, including but not limited to those briefly discussed below. In one embodiment the tertiary amine intermediate may be purchased from commercial sources, rather than starting with 3,5 dimethyl piperidine.

In one embodiment, the hydrogenation of 3,5-dimethylpyridine is carried out in the absence of water, with a suitable catalyst that favors formation of the trans isomer. It is considered that the presence of water favors formation of the cis isomer. In one embodiment, the reduction of 3,5-dimethylpyridine is carried out chemically, e.g., by use of sodium borohydride, lithium aluminum hydride, sodium hydride or formic acid. It is considered that use of a heterogeneous catalyst may result in formation of more of the cis isomer, contrary to the intent of the present invention.

In one embodiment, the ratio of the cis and trans isomers of the 3,5-dimethyl-N,N-dimethylpiperidinium cation is controlled by selective precipitation of one of the isomers, and preferential isolation and purification of the trans isomer, or of a composition containing an increased content of the trans isomer, which is subsequently paired with a hydroxide anion.

In one embodiment, the ratio of the cis and trans isomers of the 3,5-dimethyl-N, N-dimethylpiperidinium cation is controlled by selective isolation of 3,5-piperidine following hydrogenation of 3,5-pyridine, and subsequent methylation of the 3,5-piperidine to form the 3,5-dimethyl-N,N-dimethylpiperidinium cation, which is subsequently paired with a hydroxide anion.

Methods of separating the cis and trans isomers are set forth in the following, which is adapted from Ireland Patent No. 1E20040197.

The methods disclosed in the art for separating a compound from the mixture of its isomers include preferential salt formation, but this can be expensive and time consuming. It is therefore, important to devise a method for separating trans-3,5-dimethylpiperidine from a mixture of its geometrical isomers in an economical and time-efficient manner.

In one embodiment, separation of trans-3,5-dimethylpiperidine from commercially available 4:1 mixture of cis: trans-3,5-dimethylpiperidine involves a multi-step process that includes heating, filtration, extraction, crystallization and drying.

In one embodiment, a process is provided having a single step and highly selective process for the separation of trans-3,5-dimethylpiperidine from a mixture of cis:trans-3, 5-dimethylpiperidine.

U.S. Pat. No. 4,138,399 to Holland et al., which may be referred to for more detailed information, beginning at column 11, line 55, discloses the preparation of cis-3,5-dimethylpiperidine hydrochloride from 3,5-lutidine by hydrogenation under 1000 psi hydrogen pressure in ethanol using 5% rhodium on carbon as catalyst at room temperature. In this method, organic solvents like hexane and chloroform are used for the further extraction and purification of the product. The product contains approximately 78% cis and 22% trans isomers.

U.S. Pat. No. 4,820,695 to Debono et al. and U.S. Pat. No. 4,920,103 to Krist et al., which may be referred to for more information, disclose methods of purification of cis-3,5-dimethylpiperidine. In one method, in Example 39, the Debono patent discloses the addition of o-chlorobenzoyl chloride to a solution containing 3,5-dimethylpiperidine, triethylamine and dichloromethane. The use of hexane and dichloromethane is disclosed to further recrystallize the product to obtain pure cis-amide, and pure cis-3,5-dimethylpiperidine is obtained by further refluxing the amide in ethylene glycol and potassium hydroxide and then distilling and collecting the fraction boiling between 100° C. and 195° C.

An alternate method of purification of cis-3,5-dimethylpiperidine described in the above-mentioned Krist patent, beginning at column 14, line 33, discloses the preparation of the hydrochloride salt by bubbling HCl gas through the solution of commercial grade 3,5-dimethylpiperidine and anhydrous ether. The salt is further treated, employing acetone and diethyl ether to yield cis-3, 5-dimethylpiperidine, contaminated with </=5% of the trans isomer.

There are numerous prior art disclosures revealing the commercial use of cis 3,5-dimethylpiperidine, which include U.S. Pat. No. 4,713,379; U.S. Pat. No. 4,755,521, U.S. Pat. No. 4,826,857, U.S. Pat. No. 4,904,656, U.S. Pat. No. 4,615,725, U.S. Pat. No. 5,177,103, U.S. Pat. No. 5,571,930, U.S. Pat. No. 4,820,694 and U.S. Pat. No. 6,187,777, each of which may be consulted for additional information.

Although certain of the foregoing references provide for obtaining an enhanced or increased content of the cis isomer, it will be understood by those skilled in the art that by isolating one isomer, the other isomer is necessarily also separated and can be isolated. Thus, if one removes the trans isomer in an effort to obtain the cis isomer, one has necessary separated the trans isomer. In the present invention, the trans isomer is the sought isomer, and the invention relates to the use of an organic structure-directing agent containing an increased content of the trans isomer relative to the cis isomer, when compared to the commercially available material.

The present invention provides a method for separating a compound from a mixture of its geometrical isomers, wherein the compound being separated is trans-3,5-dimethylpiperidine and the mixture from which the compound being separated is a mixture of cis:trans-3,5-dimethylpiperidine.

In accordance with one embodiment of the present invention, disclosed herein is a single step process for separating cis-3,5-dimethylpiperidine from a mixture of cis- and trans-3,5-dimethylpiperidine wherein no organic solvent is used.

In accordance with another embodiment of the present invention, disclosed herein is a single step process for separating cis-3,5-dimethylpiperidine from a mixture of cis- and trans-3,5-dimethylpiperidine wherein the process comprises hydrogenation of 3,5-lutidine in the presence of water and 5% ruthenium on alumina catalyst at high temperature and pressure.

In accordance with yet another embodiment of the present invention, disclosed herein is a single step process for separating cis-3,5-dimethylpiperidine from a mixture of cis- and trans-3,5-dimethylpiperidine, wherein water present in the reaction process favors the cis-isomer formation and removes predominantly trans-isomer during the fractional separation.

In accordance with still another embodiment of the present invention, disclosed herein is a method of producing the pure form of cis-3,5-dimethylpiperidine wherein the method comprises a single step separation process to separate cis-3,5-dimethylpiperidine from a mixture of cis- and trans-3,5-dimethylpiperidine by hydrogenating 3,5-lutidine in the presence of water and 5% ruthenium on alumina catalyst at high temperature and pressure and decanting the crude product from the catalyst, recycling the catalyst in batches, carrying out fractional distillation of the crude mass to remove trans-isomer of 3,5-dimethylpiperidine as an azeotrope with water, recycling the aqueous phase in the crude and distillation of pure cis-3,5-dimethylpiperidine.

In accordance with yet another embodiment of the present invention, disclosed herein is a single step process for separating cis-3,5-dimethylpiperidine from a mixture of cis- and trans-3,5-dimethylpiperidine, wherein the process comprises hydrogenation of 3,5-lutidine in the presence of water ranging from 10-60% by weight ratio of the base, at temperature ranging from 180-220° C., pressure ranging from 30 to 60 Kg/cm$^2$, decanting the crude product from the catalyst; recycling the catalyst in batches for 5 to 20 times, carrying out fractional distillation of the crude mass to remove trans-isomer of 3,5-dimethylpiperidine as an azeotrope with water, recycling the aqueous phase in the crude and distillation of pure cis-3,5-dimethylpiperidine with 5% trans-isomer.

In accordance with still another embodiment of the present invention, disclosed herein is a single step separation process for the separation of cis-3,5-dimethylpiperidine from a mixture of cis- and trans-3,5-dimethylpiperidine, wherein the process comprises, hydrogenation of 3,5-lutidine in the presence of water and ruthenium on alumina catalyst at 180 to 200° C.

In accordance with yet another embodiment of the present invention, disclosed herein is a single step separation process for the separation of cis-3,5-dimethylpiperidine from a mixture of cis- and trans-3,5-dimethylpiperidine, wherein the process comprises, hydrogenation of 3,5-lutidine in the presence of water and ruthenium on alumina catalyst, wherein the catalyst is about 0.3-2% with respect to 3,5-lutidine.

In accordance with still another embodiment of the present invention, disclosed herein is a single step separation process, wherein the process comprises, hydrogenation of 3,5-lutidine in the presence of water and ruthenium on alumina catalyst, wherein the catalyst is about 0.5-1% with respect to 3,5-lutidine.

In accordance with yet another embodiment of the present invention, disclosed herein is a single step separation process, wherein the process comprises, hydrogenation of 3,5-lutidine in the presence of water and ruthenium on alumina catalyst, wherein the quantity of water is 10 to 60% of 3,5-lutidine.

In accordance with another embodiment of the present invention, disclosed herein is a single step separation process, wherein the process comprises, hydrogenation of 3,5-lutidine in the presence of water and ruthenium on alumina catalyst, wherein the quantity of water is 20 to 50% of 3,5-lutidine.

In accordance with yet another embodiment of the present invention, disclosed herein is a single step separation process, wherein the process comprises, hydrogenation of 3,5-lutidine in the presence of water and ruthenium on alumina catalyst, wherein the pressure is about 30 to 100 kg/cm$^2$, preferably 40 to 70 kg/cm$^2$.

In accordance with another embodiment of the present invention, disclosed herein is a process, wherein the process comprises hydrogenation of 3,5-lutidine in presence of a catalyst, wherein the catalyst can be recyclable for 5-20 times.

The disclosed embodiments deal with processes for the separation of cis-3,5-dimethylpiperidine from a mixture of cis:trans-3,5-dimethylpiperidine.

The present disclosure provides single step and highly selective process for the separation of cis-3,5-dimethylpiperidine from a mixture of cis:trans-3,5-dimethylpiperidine without employing any organic solvent.

The dimethylpiperidine containing an enhanced content of the trans- isomer, obtained by any of the foregoing methods, is first quaternized by the addition of two methyl groups to the ring N atom, then the resulting quaternary ammonium salt is converted to the quaternary ammonium hydroxide by an appropriate hydrolysis, electrolysis or ion exchange, and then this cyclic quaternary ammonium species is used as the OSDA in forming zeolites, such as that known as SSZ-39. As described in U.S. Pat. No. 5,958,370, the OSDA of the present invention, i.e, dimethylpiperidine containing an enhanced content of the trans- isomer, following its quaternization and conversion to hydroxide form, is used as the cyclic quaternary ammonium cation crystallization template.

As known in the art, Cu containing zeolites with small pore sizes, such as SSZ-39 (AEI), are very active for the SCR of NOx. Thus, in order to prepare these Cu-containing SSZ-39, $Cu^{2+}$ species are introduced into calcined samples zeolites in the H form. Since Al species that remain in tetrahedral coordination after the calcination procedures generate negative charges in the zeolitic framework, $Cu^{2+}$ species can be introduced by a post-synthesis cation exchange procedure to replace the $H^+$ within the calcined SSZ-39 materials, using, for example, an aqueous solution of $Cu(CH_3COO)_2$. Chemical analyses indicate that the metal content introduced is about 4.7 wt. % for Cu-N-SSZ-39. As is also known in the art, Fe and V may be substituted for the Cu in the zeolite when used for SCR of NOx.

EXPERIMENTAL SECTION

The organics are available from SACHEM Inc. in either chloride or hydroxide form. Hydroxide ion exchanges are performed using Dowex® Marathon A (OH—) exchange resin. Titrations are performed using a Mettler-Toledo® DL22 autotitrator using 0.01 M HCl as the titrant. 13C-CP solid state NMR spectra are recorded on a Bruker® 500 Mhz spectrometer with a 4 mm rotor at spinning rate of 10 kHz, referenced to adamantane as an external standard. Solid-state 27Al MAS NMR spectra are acquired on a Bruker® AM 300 MHz spectrometer operated at 78.2 MHz using a 90° pulse length of 2 μs and a cycle delay time of 1 s. Samples are loaded in a 4 mm $ZrO_2$ rotor and spun at 12 kHz. Chemical shifts are referenced to 1 M aqueous aluminum nitrate solution. Before measurement, samples are hydrated overnight over a saturated KCl solution. Thermogravimetric analysis is performed on a Perkin Elmer® STA 6000 with a ramp of 10° $C.min^{-1}$ to 900° C. under air atmosphere. Scanning electron microscopy (SEM) is performed on as-synthesized (washed and dried at 100° C.) samples with a ZEISS® 1550 VP FESEM, equipped with an Oxford X-Max SDD X-ray Energy Dispersive Spectrometer (EDS) system for determining the Si/Al ratios of the samples. The calcination of SSZ-39 is performed in dry flowing air by heating to 150° C. at 1° $C.min^{-1}$; holding for 3 h at 150° C., and then heated further to 580° C. at 1° $C.min^{-1}$ and held for 6 h. All powder x-ray diffraction (PXRD) characterization is conducted on a Rigaku® Mini-Flex II with Cu Kα radiation. Elemental analysis of calcined zeolite samples is performed by Galbraith Labs (Knoxville, TN). All $N_2$ adsorption isotherms are performed at -196° C. with a Quantachrome® Autosorb iQ instrument. Prior to analysis, the samples are outgassed under vacuum at 350° C. The t-plot method is used to calculate the micropore volumes on the adsorption branch. For analyzing the organic occluded in the zeolite, the latter is completely dissolved in a 50 wt % HF solution. After neutralization with KOH (exothermic process, cooling required), the solution is dried under a stream of air to remove excess water and then the solids are dried under vacuum at room temperature. Then, $CDCl_3$ is added to dissolve the extracted organic and the isomers ae analyzed by $^1H$ NMR (quantification) and $^{13}C$ NMR.

A general procedure for hydroxide mediated zeolite syntheses is as follows. The organic SDA in its hydroxide form is combined with additional base (1N NaOH, RT Baker) and water in a 23 mL-Teflon Parr reactor. Then a silicon source is added (N° Sodium silicate (PQ Corporation) or Ludox AS-40) as well as an aluminum source (for example, CBV500, a $NH_4$-USY zeolite with Si/Al of 2.6 from Zeolyst Corp.). The synthesis gel is then manually stirred with a spatula until a homogenous white gel is obtained. The Teflon Parr reactor is then sealed and placed in a rotating (spinning at 63 rpm) or static oven at temperatures ranging from 125 to 140° C. Alternatively, tetraethylorthosilicate (TEOS) is used as the source of silica. TEOS is combined with the additional base source (1N NaOH) in a 23 mL-Teflon Parr reactor, closed and stirred overnight at room temperature to allow for complete hydrolysis. The lid is then removed and the organic SDA in its hydroxide form as well as the aluminum source (CBV500) are added and stirred till a homogeneous gel is attained. The lid is then removed and ethanol and the appropriate amount of water are allowed to evaporate under a stream of air. It is assumed that all the ethanol evaporates along with the water. Once the appropriate mass is reached, the Teflon Parr reactor is sealed and placed in a rotating oven at 140° C. Aliquots of the synthesis gels are taken periodically as follows: quenching the reactor in water, opening the reactor, stirring its contents till homogeneous, and finally removing enough material for PXRD. After washing the aliquots once with water and once with acetone, with intermittent centrifugation, they are left to dry in a 100° C. oven before PXRD measurement. After total synthesis time, the zeolites are collected by centrifugation, washed 3 times with water and once with acetone, with intermittent centrifugation, and then left to dry overnight at 100° C. The yields are calculated as follows: the oven-dry zeolite weight obtained is corrected with the weight loss of organic SDA and water in TGA up to 900 ° C. (15-18% in a typical synthesis). This corrected weight is assumed to be pure aluminosilicate and is divided by the maximum theoretical oxide ($SiO_2$+$AlO_2$) formation based on the input silicon and aluminum. The weight of sodium present in the samples is hereby neglected. The weight loss in TGA between 300 and 900° C. is considered to be due to the loss of incorporated OSDA (amine form).

Another method for forming the OSDA N, N-dimethyl-3, 5-dimethylpiperidinium is as follows. 10 g of 3,5-dimethylpiperidine having the desired enhanced trans- isomer content, is mixed with 140 mL of methanol and 19.51 g of potassium carbonate ($KHCO_3$). While this mixture is stirred, 54 g of methyl iodide is added dropwise. The reaction is stirred for about 7 days. After this time, MeOH is partially removed under vacuum, and the iodide salt is precipitated by addition of diethyl ether. For its use in the synthesis of zeolites, the final product may be ion exchanged to the hydroxide form using a commercially available hydroxide ion exchange resin, e.g., Dowex® SBR. Instead of ion exchange, electrolytic methods such as those used by Sachem, Inc. may be employed. See. e.g., U.S. Pat. Nos. 5,389,211, 5,575,901, 5,753,097.

Results and Discussion

General SSZ-39 Synthesis Considerations

In order to assess the influence of the isomeric forms of the common lupetidines and the possibility of using mixtures of isomeric OSDAs, a standard SSZ-39 recipe was needed. Zones, in U.S. Pat. No. 5,958,370, reported the first synthesis of SSZ-39 in hydroxide mediated syntheses. Procedures listed in the patent demonstrate the use of sodium silicate and a zeolite of the FAU topology (USY) as the respective silica and alumina sources. The reported results showed successful syntheses of SSZ-39 with 13 different OSDAs from gels with Si/Al ratios around 15. They also showed that a gel with Si/Al of 50 led to SSZ-39 (with Si/Al ratio of 25). Besides other FAU zeolites, no other sources were presented in this study. Later, Wagner et al. elucidated the structure of SSZ-39 and showed that it is the aluminosilicate analogue of SAPO-18 with the AEI framework topology. Wagner et al. reported successful SSZ-39 syntheses from gels with a Si/Al ratio of 15, in analogy to the original patent, whereas attempts to make SSZ-39 in gels with Si/Al ratios of 20 and higher resulted in other phases such as MFI and MTW.

Recently, Moliner et al. reported similar results, confirming the fact that sodium silicate ($Na_2SiO_3$) and FAU precursors in gels with Si/Al ratios 15 and 30 lead to SSZ-39, whereas other sources of inorganics do not lead to SSZ-39. The OSDA used in the latter study was N,N-dimethyl-3,5-lupetidinium, but the cis:trans ratio of the organic was not reported. In addition to these hydroxide syntheses, Cao et al. disclosed a fluoride-mediated route towards high-silica SSZ-39. Using N,N-diethyl-2,6-lupetidinium as the SDA, these low-water syntheses are reported to produce SSZ-39 with Si/Al ratios of over 50.

Figure 8:
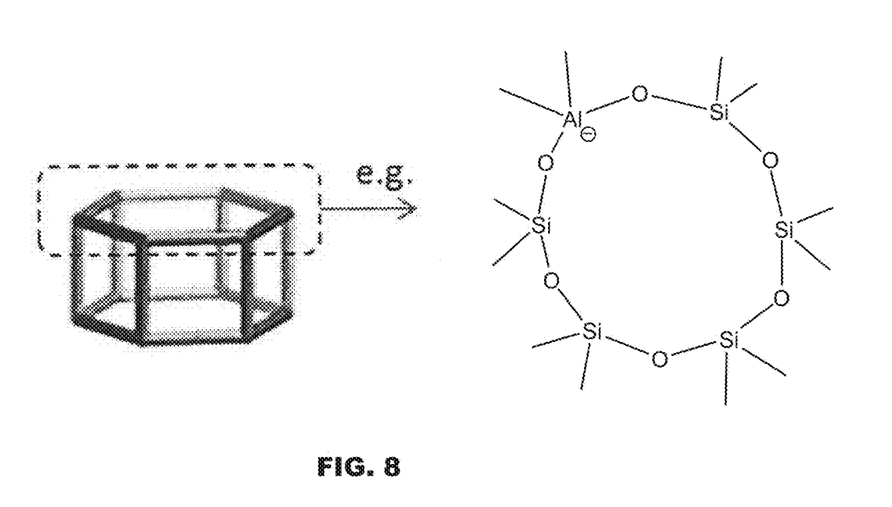
FIG. 8 is a schematic depiction of a double six-ring composite building unit d6r.

Based on this literature overview, a wide screening of common procedures and sources of inorganics was carried out using cis-N,N-dimethyl-3,5-lupetidinium (cis-3,5) as the SDA over a range of Si/Al ratios. In line with literature data, initially only sodium silicate and FAU as inorganic sources yielded SSZ-39. Other recipes, consistent with those reported by Wagner et al., led to SSZ-36 or pentasil type zeolites (e.g., MFI). Sodium silicate is a monomolecular Si source, unlike colloidal Si gels and aerosils. To see whether a monomolecular source of Si is vital, TEOS and colloidal Si were used instead of sodium silicate with the FAU aluminum source. From the results, it is clear that SSZ-39 can be prepared using monomolecular TEOS and colloidal Si as well, but the latter led to the co-formation of a major impurity, analcime (ANA). The FAU Al source on the other hand is more crucial, as no synthesis was found successful without its presence. Remarkably, both AEI and FAU frameworks can be entirely built using only the double six-ring composite building unit d6r, shown in FIG. 8.

Interestingly, a hydrothermal transformation of FAU into AEI zeolites was recently reported, using tetraethylphosphonium cations. In general, an optimal gel compositional range was found to be 1Si:0.033-0.066Al:0.07-0.14OSDA: 0.65-0.71$OH^{31}$:0.51-0.58$Na^+$:20-30$H_2O$, with OH—being the sum of the NaOH and OSDA($OH^{31}$) contents.

Another method of synthesizing SSZ-39 zeolite, reported by N. Martin, et al., Chem. Comm., 2015, 51, 11030-11033 (published 2 Jun. 2015), is as follows. First the OSDA N,N-dimethyl-3,5-dimethylpiperidinium hydroxide is mixed with a 20% wt aqueous solution of sodium hydroxide. Then, the crystals of USY zeolite (CBV-720 with $SiO_2$/$Al_2O_3$=21) are introduced in this solution. The mixture is stirred until complete homogenization of the gel. The chemical composition of the synthesis gel is about $SiO_2$/ 0.045$Al_2O_3$/0.2NaOH/0.2 OSDA/15 $H_2O$. The resultant gel was transferred into a stainless steel autoclave with a Teflon liner. The crystallization is then conducted at 135° C. for 7 days under static conditions. The solid product is filtered, washed with water and dried at 100° C. Finally, the sample is calcined in air at 550° C. for 4 h.

The following information on a process for forming SSZ-39 is taken from U.S. Pat. No. 5,958,370.

Typical sources of aluminum oxide for the reaction mixture include aluminates, alumina, aluminum colloids, aluminum oxide coated on silica sol, hydrated alumina gels such as Al(OH)3 and aluminum compounds such as $AlCl_3$ and $Al_2(SO_4)_3$.

Typical sources of silicon oxide include silicates, silica hydrogel, silicic acid, fumed silica, colloidal silica, tetraalkyl orthosilicates, and silica hydroxides. Boron, as well as gallium, germanium, titanium, indium, vanadium and iron, can be added in forms corresponding to their aluminum and silicon counterparts. However, SSZ-39 contains only Si and Al.

Typically, an alkali metal hydroxide and/or an alkaline earth metal hydroxide, such as the hydroxide of sodium, potassium, lithium, cesium, rubidium, calcium, and magnesium, is used in the reaction mixture; however, this component can be omitted so long as the equivalent basicity is maintained. In one embodiment, the alkali metal or alkaline earth metal hydroxides may be replaced by an organic base, such as tetramethyl ammonium hydroxide, or another tetraalkyl ammonium hydroxide known in the art. The OSDA may be used to provide hydroxide ion. Thus, it may be beneficial to ion exchange, for example, the halide for hydroxide ion, thereby reducing or eliminating the alkali metal hydroxide quantity required. When the alkali metal hydroxide and/or the alkaline earth metal hydroxide is used, the alkali metal cation or alkaline earth cation may be part of the as-synthesized crystalline oxide material, in order to balance valence electron charges therein. This can be replaced by either H or, for example, $Cu^{2+}$, to form the desired product Cu-SSZ-39.

The reaction mixture is maintained at an elevated temperature until the crystals of the SSZ-39 zeolite are formed, using mild stirring or agitation. The hydrothermal crystallization is usually conducted under autogenous pressure, at a temperature between 100° C. and 200° C., preferably between 135° C. and 160° C. The crystallization period is typically about 3 days. However, as noted herein, one of the benefits of the present invention is that by use of the enhanced trans-content the reaction time can be significantly reduced, e.g., from 3 days to 2 days, which is a very significant improvement.

During the hydrothermal crystallization step, the SSZ-39 crystals can be allowed to nucleate spontaneously from the reaction mixture. The use of SSZ-39 crystals as seed material can be advantageous in decreasing the time necessary for complete crystallization to occur. In addition, seeding can lead to an increased purity of the product obtained by promoting the nucleation and/or formation of SSZ-39 over any undesired phases. When used as seeds, SSZ-39 crystals are added in an amount between 0.1 and 10% of the weight of silica used in the reaction mixture.

Once the zeolite crystals have formed, the solid product is separated from the reaction mixture by standard mechanical separation techniques such as filtration. The crystals are water-washed and then dried, e.g., at 90° C. to 150° C. for from 8 to 24 hours, to obtain the as-synthesized SSZ-39 zeolite crystals. The drying step can be performed at atmospheric pressure or under vacuum.

Influence of cis/trans Isomer

The hydrogenation of the commercially relevant 3,5-lutidine leads to diastereomeric 3,5-lupetidine mixtures containing both the cis and trans-form depending on the catalysts used. Using metallic Pt and $H_2$ will lead to a product mixture with an 80/20 cis/trans isomer ratio, whereas under certain conditions, Raney Nickel catalysts produce mixtures of 25/75 cis/trans composition. If the amine is methylated before hydrogenation, pure cis-N-methyl-3,5-lupetidine can be synthesized with Pt catalysts. By preparing a nearly pure cis-3,5 isomer, along with an equimolar mixture, the isomeric range between 48/52 and 98/2 (cis-3,5/trans-3,5) could be assessed. This range is in line with the production of these isomers, as it is very difficult to produce the pure trans-isomer. The influence of diastereo-isomer ratio on the synthesis of SSZ-39 is illustrated by the data shown in Table I where different isomeric mixtures of quaternized N,N-dimethyl-3,5-lupetidinium hydroxide are employed OSDAs in two sets of gels with different Si/Al ratios (15 and 30).

TABLE I

Hydroxide syntheses with mixtures of cis and trans-N,N-dimethyl-3,5-lupetidinium hydroxide using sodium silicate as silica and NH4-FAU as alumina sources. gel composition relative to Si1

| Entry | Al | cis-3,5 | trans-3,5 | NaOH | cis/trans2 | time (days) | phase | Si/Al | TGA3 | Yield |
|---|---|---|---|---|---|---|---|---|---|---|
| 1 | 0.033 | 0.137 | 0.003 | 0.57 | 98/2 | 3 | SSZ-39 | 7.6 | 19.2% | 19% |
| 2 | 0.033 | 0.067 | 0.073 | 0.57 | 48/52 | 3 | SSZ-39 | 8.4 | 19.7% | 19% |

Figure 1:
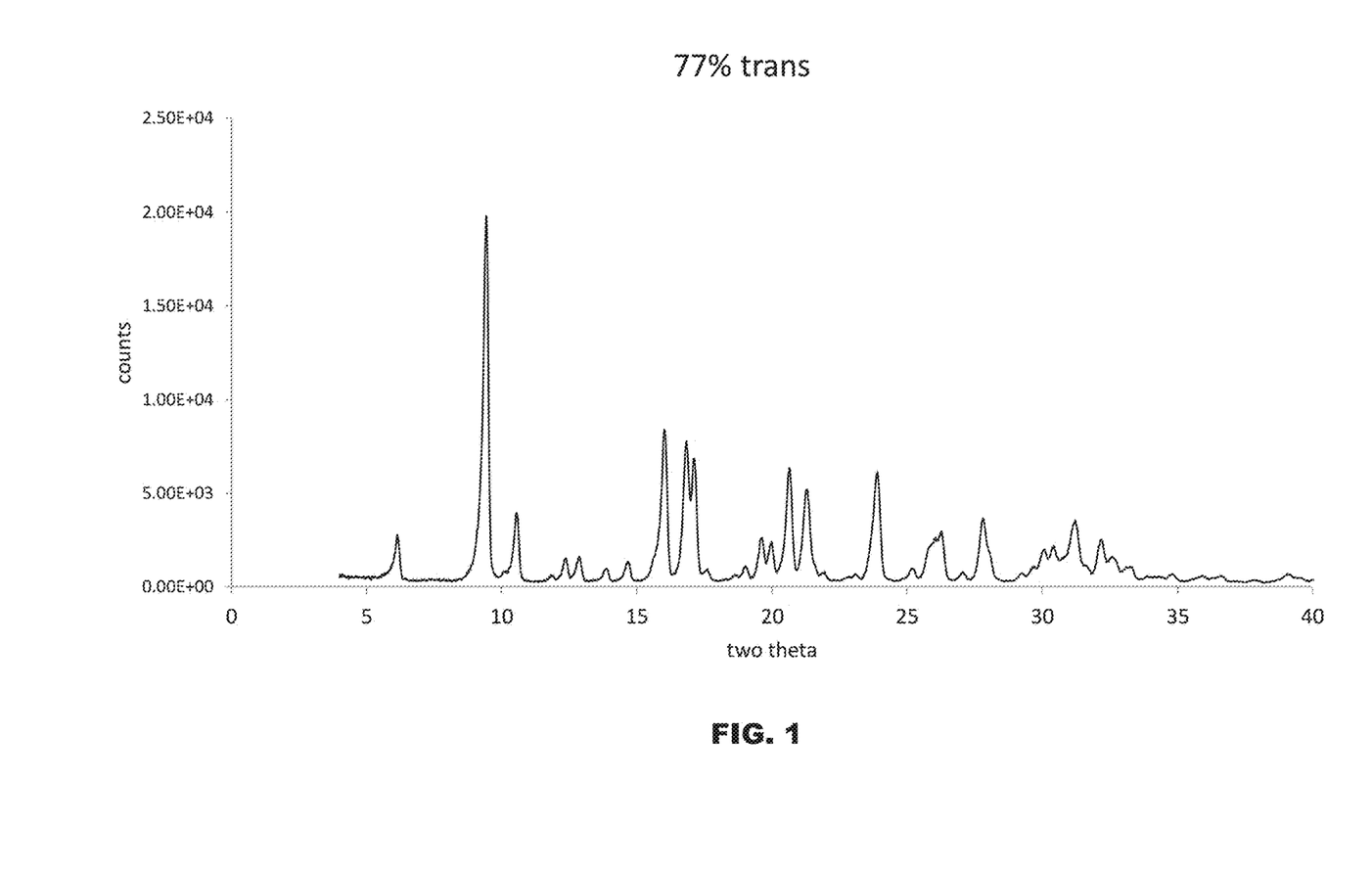
FIG. 1 is an X-ray diffraction scan for a product made in accordance with an embodiment of the present invention containing about 77% trans isomer of the OSDA.
Figure 4:
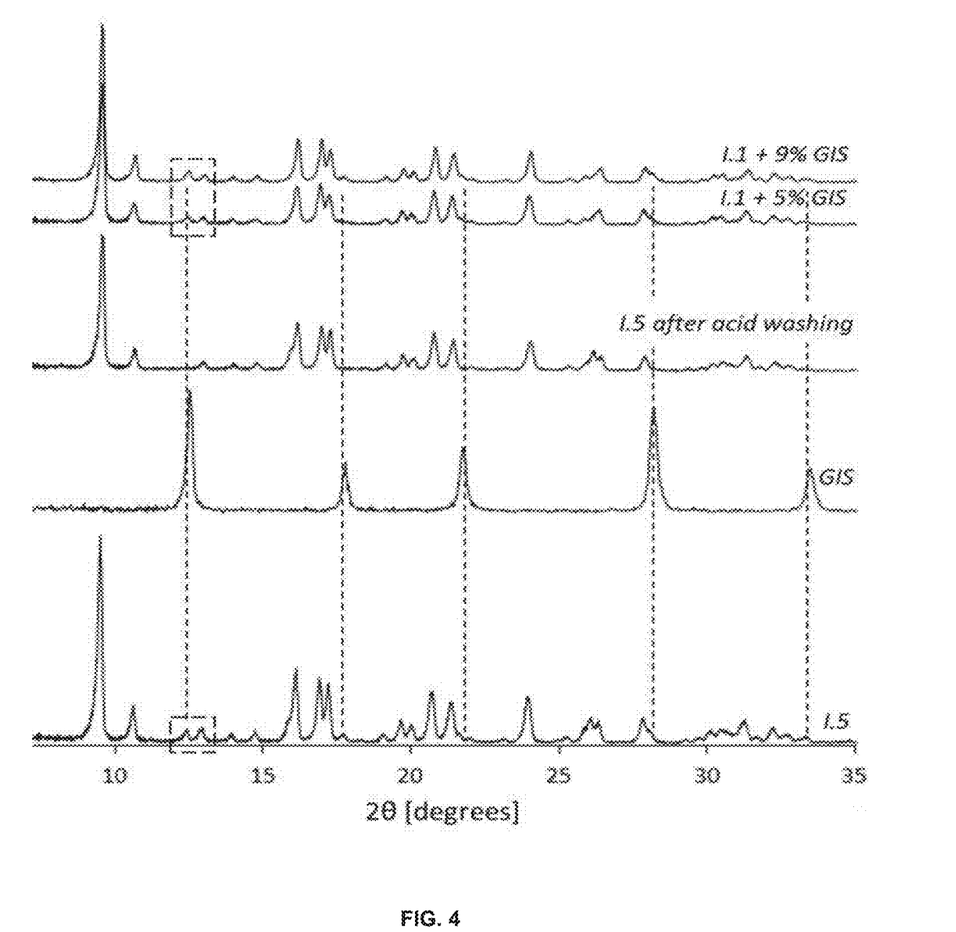
FIG. 4 is a series of PXRD scans of Si/Al=15 derived zeolites containing both SSZ-39 as the major phase, and a trace of the aluminosilicate gismondine, as that zeolite is washed with acid to remove the gismondine phase.

Entries 1 and 2 in Table I, for Si/Al ratios of 30, reveal no significant influence of the diastereo-isomer ratio of the 3,5-isomer on the preparation of SSZ-39: the produced-phase, pure SSZ-39, is identical in each run, as demonstrated by PXRD in FIG. 1 (Trace 1.1 and 11.2). Additionally, the phase, yield and synthesis time (kinetics) appear unaffected as well since both syntheses finished in 3 days (based on the absence of reflections of the FAU source in PXRD). Further characterizations of the produced solids were performed by TGA and SEM/EDS analyses. The Si/Al ratios of both SSZ-39 solids were found to be near 8, in line with Moliner et al., and the total amount of incorporated OSDAs were around 20% (ca. filling of 1 organic molecule per cage of the structure or 4 OSDA molecules per unit cell). The product Si/Al values (8) differ distinctly from the ratios in the gels (30). This result suggests an explanation for the low product yields (20%). Due to the formation of Al-rich SSZ-39, the gel becomes deficient in Al at some point in the synthesis, and a large fraction of dissolved Si remains unused. Additionally, the SSZ-39 morphologies are similar and closely resemble those reported previously. Some clear differences however exist between these syntheses and the ones with Si/Al ratios of 30 in the gel. First, the Si/Al ratios of the products from Si/Al=15 gels are found to be around 6. Although lower than the values obtained from more Al-deficient gels, the product ratios are diverging less from the ratio in the gels (6 to 15 versus 8 to 30) and explain the higher yields from Si/Al=15 gels. Secondly, a closer examination of the PXRDs of the Si/Al=15 derived zeolites reveals SSZ-39 as the major phase, but with a trace of the aluminosilicate gismondine (GIS), e.g., the reflection at 2θ=12.4. The origin of this impurity is attributed to the inorganic structure directing nature of the sodium- and hydroxide-rich gel. For catalytic applications, the presence of trace impurity phases can be a problem. In an effort to remove the impurities, we found that the as-synthesized SSZ-39 could be easily be purified by contacting it with a 1 M HCl solution at 100° C. for only 1 h (no stirring, 10 gram of zeolite per liter). This conclusion is evidenced by data shown in FIG. 4 that are from the solids obtained before and after contacting with HCl. This simple treatment completely dissolves the GIS phase. To further verify this result and to estimate the amount of impurity in the as-made SSZ-39, we made a pure GIS zeolite in presence of the cis-3,5 isomer by using sodium aluminate. The PXRD of this zeolite can be seen in FIG. 4. TGA analysis of the 8MR GIS zeolite confirmed that virtually no organic was incorporated (<2%). The PXRD patterns of physical mixtures of GIS and pure SSZ-39 (the as-made zeolite of Table 1.1), shown in FIG. 4, allowed us to roughly estimate the level of impurity in Si/Al=15-derived SSZ-39s to be on the order of 5 wt.% (based on intensities of the 2θ=12.4 region). Since GIS phases usually have a low Si/Al ratio, the bulk Si/Al ratio of the HCl-treated zeolite rose (from 6.2) to 7.5 as determined by EDS and confirmed by elemental analysis below.

Figure 5:
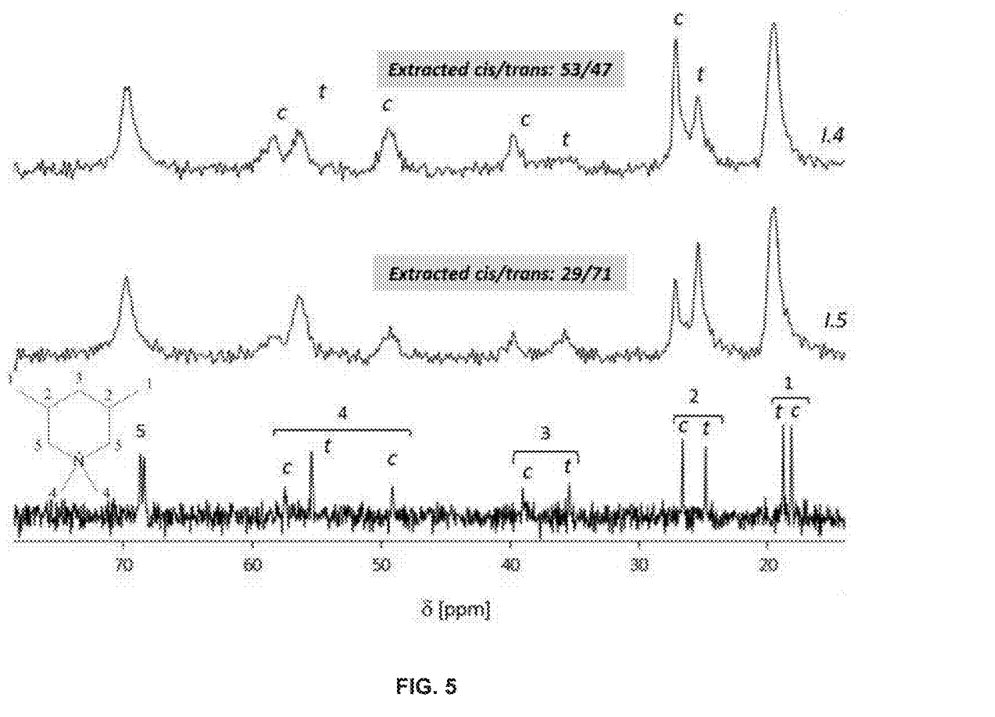
FIG. 5 is a $^{13}C$ CP-MAS solid state NMR on as-made samples of SSZ-39 that can distinguish the cis from the trans isomer occluded in the cages of the SSZ-39.

The TGA results in Table I demonstrate that the same total amount of organic is incorporated in the SSZ-39s made with different isomer ratios. However, the stereo-chemistry of the occluded organics in these solids may be different. To address this issue, the occluded organic content was analyzed. Remarkably, $^{13}$C CP-MAS solid state NMR on as-made samples was able to distinguish the cis from the trans isomer occluded in the cages of SSZ-39, as shown in FIG. 5. While the NMR trace of SSZ-39 made with pure cis-3,5 displayed the 6 characteristic resonances related to the cis-3,5-standard (not shown), the spectra of the SSZ-39 made with the 73/27 and the 48/52 cis/trans-3,5 mixture displayed resonances of both cis and trans isomers in SSZ-39. The relative integration of the 27 versus 25 ppm peak hinted to a preferential uptake of the trans isomer with respect to the ratio of the gel. However, due to the non-quantitative nature of CP-MAS NMR, the isomer ratio inside SSZ-39 is verified by dissolving the as-made materials in HF, extracting the SDAs in CDCl$_3$ and analyzing them by $^1$H-NMR. These isomer ratios are shown in grey above the CP-MAS traces in FIG. 5 and corroborate the preferential incorporation of the trans isomer. The 48/52 gel, for instance, produced SSZ-39 with a 29/71 cis/trans ratio. The assignments of the chemical shifts for both isomers were verified using liquid phase NMR and $^1$H-$^{13}$C-HSQC.

Figure 6:
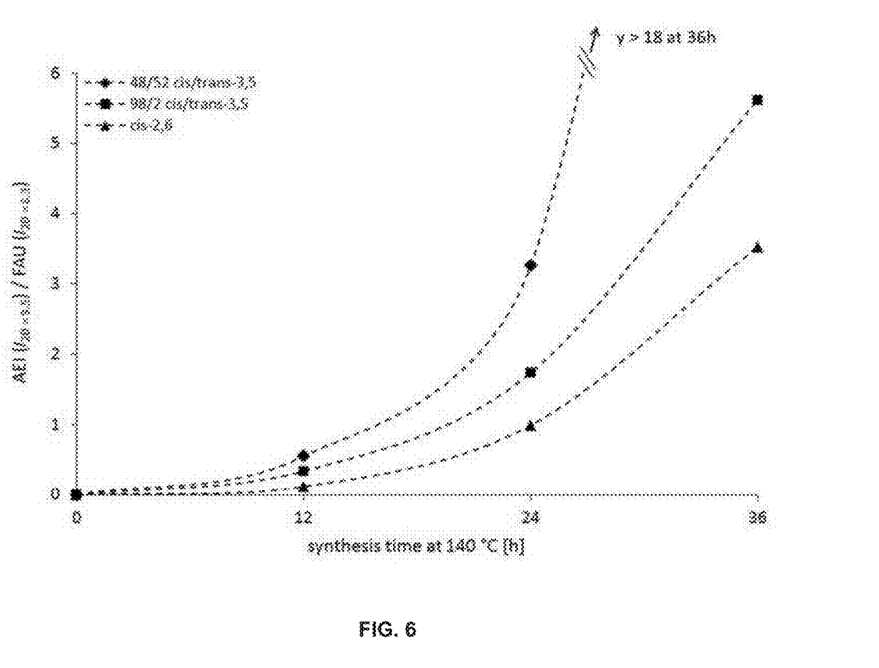
FIG. 6 is a graph showing the kinetics of SSZ-39 synthesis with different OSDA isomer ratios, based on the FAU reagent and AEI product reflections in PXRD.

Although there is a preference for the incorporation of the trans-3,5 isomer, both isomer mixtures as well as nearly-pure cis-3,5 are able to produce SSZ-39. To further investigate this phenomenon, the kinetics at the early stages of SSZ-39 syntheses were studied by taking intermediate samples of syntheses with 98/2 and 48/52 cis/trans-3,5 isomeric ratios after 12 h, 24 h and 36 h. Because the starting FAU source is still present in these samples, and visible in PXRD, the kinetics of SSZ-39 formation can be assessed by relative comparison of the intensities of the major reflection of AEI (9.5° 2θ) and FAU (6.3° 2θ), as shown in FIG. 6. FIG. 6 is a graph showing the kinetics of SSZ-39 synthesis with different OSDA isomer ratios (based on the FAU reagent and AEI product reflections in PXRD), with the conditions shown in Table I. A clear difference in the kinetics of zeolite formation is noted between the 48/52 mixture and the near pure cis-3,5 isomer, with the high-in-trans synthesis notably faster. However, by 3 days of synthesis time, the results from these syntheses are the same (Table 1). These initial kinetic data, together with the observed preferential incorporation, point to the fact that the presence of the trans isomer is a positive (at least faster) for SSZ-39 synthesis.

Characterization of SSZ-39 Samples

Figure 7A:
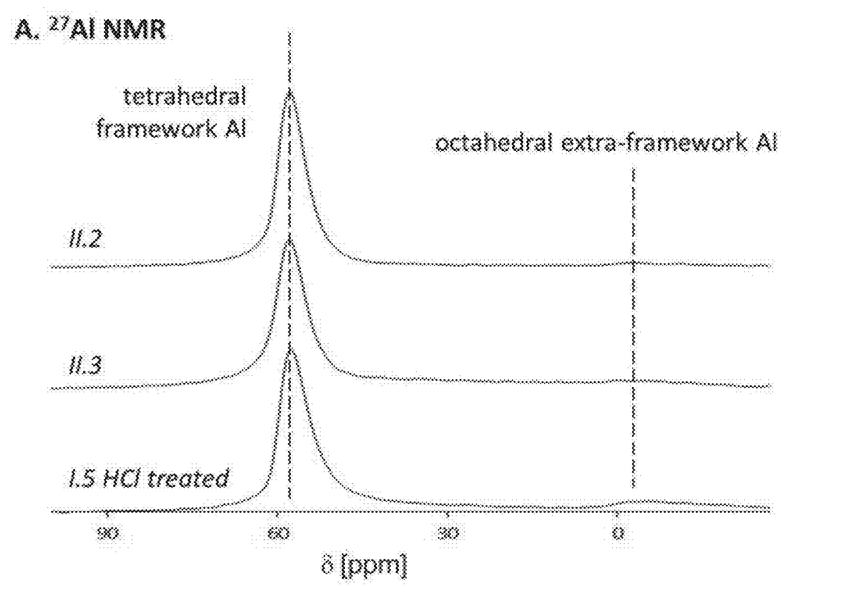
Figure 7B:
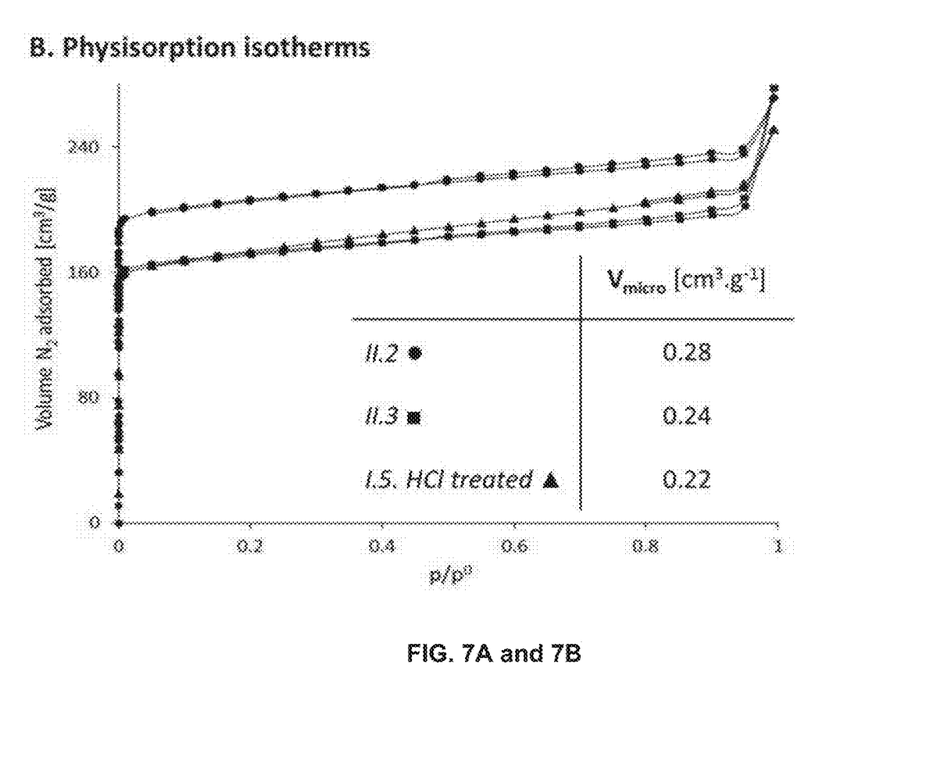
FIG. 7B shows the $N_2$-physisorption isotherms and micropore volume from t-plot analyses ($H^+$-form).

We selected three SSZ-39 samples made with different OSDA mixtures and/or gel recipes for characterization. After calcination for removal of the organic, Al MAS-NMR and full elemental analysis was performed, as well as SEM for analyzing the crystallite morphologies. Additionally, after $NH_4$-exchange and calcination, the microporosity of the H-SSZ-39 solid was analyzed. FIG. 7 and Table II display an overview of these results.

TABLE II

Full elemental analysis after calcination

| Sample | Na | Si | Al | Si/Al |
|---|---|---|---|---|
| II.2 | 1.1 | 4.0 | 36.9 | 9.1 |
| II.3 | 5.1 | 4.6 | 36.3 | 7.9 |
| I.5 HCl treated | 0.7 | 5.2 | 37.8 | 7.2 |

The pure SSZ-39s obtained from Si/Al=30 gels were selected for study, as the latter represents a pure cis-3,5 synthesis. The third sample assessed is the acid-treated version from Table I, derived from a mixed diastereo-isomer (50/50 cis/trans-3,5) synthesis with preferred trans uptake in a Si/Al=15 gel. FIG. 7A is the $^{27}$Al MAS NMR of calcined SSZ-39s made with different isomer OSDA mixtures. The numbers correspond to the entries in Tables I and II. FIG. 7B shows the $N_2$ physisorption isotherms and micropore volume from t-plot analyses (H+-form). The Al NMR traces in FIG. 7A with dominating bands at 57 ppm show that nearly all of the aluminum is incorporated tetrahedrally into the framework. The elemental analyses in Table II confirm the Si/Al ratios as measured by EDS. The Na/Al ratios are around 0.3 for both entries II.2 and II.3, but much lower for the acid washed material.

This is caused by the HCl-mediated exchange of some of the Na cations for H+. The presence of Na cations in the calcined SSZ-39s explains the slightly lower Si/Al ratios than what theoretically could be expected for a complete filling of each cage with one OSDA. The Si/Al values for samples 11.2 and 11.3 respectively lead to 4.8 and 5.4 Al atoms per unit cell. This tetrahedral Al should induce an equimolar amount of negative framework charge and is compensated by a maximum of 4 positively charged SDAs (in 4 cages) per unit cell. Combining TGA and elemental analysis, 3.9 OSDAs per unit cell were calculated for both materials. The charge deficit (viz. −0.9 and −1.5) is thus roughly accounted for by the presence of respectively 1.3 and 1.75 $Na^+$ per unit cell for 11.2 and 11.3 as measured by elemental analysis. The micropore volumes, shown in FIG. 7B, seem to differ to some extent, with the lowest value obtained for the acid-washed material (0.22 cc/g). This could be originating from the slightly higher Al content of this material. Generally, the pore volumes (and type of isotherm) are within the expected range for a highly crystalline microporous 3-dimensional 8MR molecular sieve with cages, and in line with SSZ-39 literature.

Finally, the crystal morphologies of all calcined materials are similar (square-rectangular) and size in the range of 0.5-1 μm, although the material made with pure cis-3,5 is slightly smaller (11.3). From these characterizations, it can be concluded that all SSZ-39 samples, although prepared with different isomer mixtures, are typical SSZ-39 materials. However, only the processes using the OSDA with the enhanced trans-content, in accordance with the present invention, provided the benefits of faster reaction time, higher yield and/or better control of Si/Al ratios in the SSZ-39 product.

CONCLUSIONS

The objective of this study was to investigate whether the synthesis of SSZ-39 could be accomplished with mixtures of isomers that occur in the production of dimethylpyridine-based organic structure directing agents. The influence of both diastereo-isomers as well as structural isomers of quaternized (N,N-dimethyl) lupetidines was assessed. We found that: i) pure SSZ-39 can be made with either of the cis-3,5 or trans-3,5 isomers and mixtures thereof; a relative rate-of-SSZ-39-formation exists as follows: trans-3,5>cis-3,5; when presented in competition, a preferential incorporation of the trans-3,5 over the cis-3,5 isomer exists; iv) GIS is a common impurity in synthesis from Al-rich gels, but it can be removed by a simple HCl-treatment that preserves the OSDA-stabilized SSZ-39; and v) SSZ-39s from different isomer origins possess similar physicochemical properties.

The following examples are provided to illustrate obtention of a preferred isomer.

Isomer Example 1

880 gm 3,5-lutidine and 220 gm water are charged in a 2 liter autoclave. To this solution 4.4 gm ruthenium on alumina (5% Ru) is charged. The autoclave is boxed up and flushed with nitrogen gas thrice followed with the flushing by hydrogen gas twice. The autoclave is pressurized with hydrogen gas and the mass is heated to 190 to 200° C. After achieving 190 to 200° C., the hydrogen pressure is increased to 45 to 55 $kg/cm^2$ and pressure is continued till the hydrogen consumption ends. The sample is checked for complete conversion of 3,5-lutidine and 1120 gm crude product is obtained. The G.C. analysis shows cis-81.12 area % and trans-17.99 area %. The crude mass is decanted and the catalyst is recycled during hydrogenation.

The crude mass is charged for fractional distillation along with 75 gm of fresh or recycled water in a two meter, 1 inch diameter column, filled with Sulzer packings. The trans isomer is removed as the azeotrope and collected in decanter. The organic layer from the decanter, rich in trans isomer, is used for further isolation.

The aqueous phase is recycled in the same crude to draw out trans-isomer predominantly. Trans-3,5-dimethylpiperidine is enriched at the top leaving the cis-isomer predominantly at the bottom. After removal of water, once the trans isomer is removed as per the desired limit, cis-3,5-dimethylpiperidine is distilled out.

Isomer Example 2

880 gm 3,5-lutidine is charged in a 2 liter autoclave, then 4.4 gm ruthenium on alumina (5% Ru) is charged in autoclave. The autoclave is boxed up and flushed with nitrogen gas thrice followed with the flushing by hydrogen gas twice. The autoclave is pressurized with hydrogen gas and the mass is heated to 190 to 200° C. After achieving 190 to 200° C., the hydrogen pressure is increased to 45 to 55 $kg/cm^2$ and pressure is continued till the hydrogen consumption is complete. The sample is checked for complete conversion of 3,5-lutidine and 1120 gm crude product is obtained. The G.C. analysis shows cis 68 area % and trans 31.2 area %. The crude mass is decanted and the catalyst is recycled during hydrogenation.

The crude mass is charged for fractional distillation along with 75 gm of water in a two meter, 1 inch diameter column, filled with Sulzer packings. The trans isomer is azeotroped and collected in a decanter. The organic layer from the decanter, rich in trans isomer, is removed for further isolation. The aqueous phase is recycled in the same crude to draw out trans-isomer predominantly. Trans-3,5-dimethylpiperidine is enriched at the top leaving the cis-isomer predominantly at the bottom.

Isomer Example 3

880 gm 3,5-lutidine and 220gm water are charged in a 2 liter autoclave. To this solution 4.4 gm ruthenium on alumina (5% Ru) is charged. The autoclave is boxed up and flushed with nitrogen gas thrice followed with the flushing by hydrogen gas twice.

The autoclave is pressurized with hydrogen gas and the mass is heated to 190 to 200° C. After achieving 190 to 200° C., the hydrogen pressure is increased to 45 to 55 kg/cm$^2$ and pressure is continued till the hydrogen consumption is complete. The sample is checked for complete conversion of 3,5-lutidine and 1120 gm crude product is obtained.

Zeolite Example #1 (Si/Al=15)

To a 23 ml Teflon® jar is added: 3.835 g N grade sodium silicate (Na/Si ratio=3.21, PQ Corporation), 0.4 ml 1 M/l sodium hydroxide), 2.5 ml 23/77 cis/trans-N,N-dimethyl, 3,5 dimethylpiperidinium hydroxide (20%, Sachem, Inc.), 0.335 faujasite (e.g., CBV-500 SiO$_2$/Al$_2$O$_3$=5.2, Zeolyst Corp.) and 8.88 ml DI H$_2$O. The mixture is stirred for 2 hours at ambient temperature, then the Teflon® jar in inserted into a sealed autoclave. The autoclave is placed in an oven at 140 C for 48 hours and rotated at 60 rpm. The autoclave is then removed from the oven and cooled to room temperature. The solids and mother liquors are then separated by centrifugation (or filtration). The solids are dried and weighed, and then characterized by X-ray diffraction (XRD).

The yield of the product zeolite SSZ-39 can be estimated by comparing the areas of the XRD peaks at 2 theta=9.5 (characteristic of SSZ-39) and 6.2 degrees (characteristic for faujasite), as shown in FIG. 1.

Zeolite Example #2 (Si/Al=15)

To a 23 ml Teflon® jar is added: 3.835 g N grade sodium silicate (Na/Si ratio=3.21, PQ Corporation), 0.4 ml 1 M/l sodium hydroxide), 2.5 ml 72/28 cis/trans-N,N-dimethyl, 3,5 dimethylpiperidinium hydroxide (20%, Sachem, Inc), 0.335 faujasite (e.g., CBV-500 SiO$_2$/Al$_2$O$_3$=5.2, Zeolyst Corp.) and 8.88 ml DI H$_2$O. The mixture is stirred for 2 hours at ambient temperature, then the Teflon® jar in inserted into a sealed autoclave. The autoclave is placed in an oven at 140 C for 48 hours and rotated at 60 rpm. The autoclave is then removed from the oven and cooled to room temperature. The solids and mother liquors are then separated by centrifugation (or filtration). The solids are dried and weighed, and then characterized by X-ray diffraction (XRD)

Figure 2:
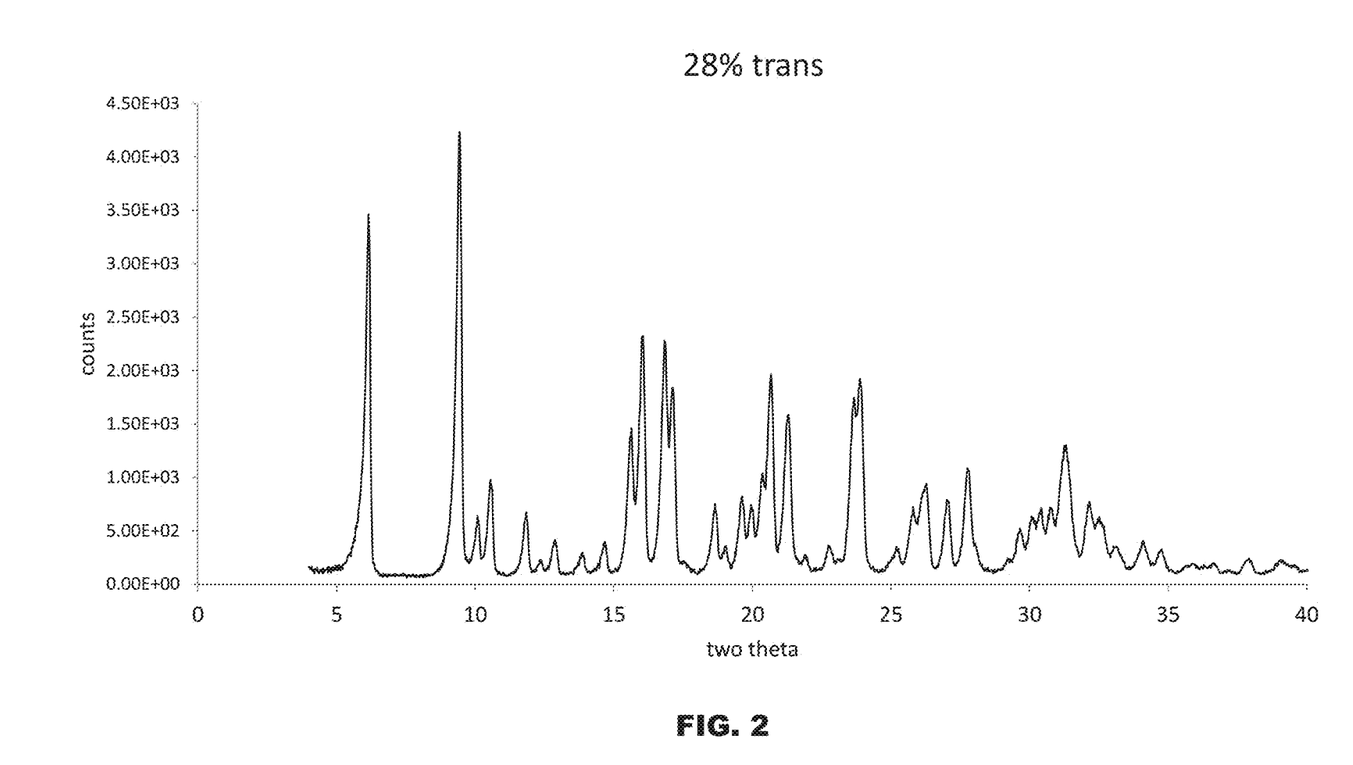
FIG. 2 is an X-ray diffraction scan for a product made in accordance with an embodiment of the present invention containing about 28% trans isomer of the OSDA.

As in Zeolite Example 1, the yield of the product zeolite SSZ-39 can be estimated by comparing the areas of the XRD peaks at 2 theta =9.5 (characteristic of SSZ-39) and 6.2 degrees (characteristic for faujasite), as shown in FIG. 2.

Zeolite Example #3 (Si/Al=15)

To a 23 ml Teflon® jar is added: 3.835 g N grade sodium silicate (Na/Si ratio=3.21, PQ Corporation), 0.4 ml 1 M/l sodium hydroxide), 2.5 ml 86/14 cis/trans-N,N-dimethyl, 3,5 dimethylpiperidinium hydroxide (20%, Sachem, Inc.), 0.335 faujasite (e.g., CBV-500 SiO$_2$/Al$_2$O$_3$=5.2, Zeolyst Corp.) and 8.88 ml DI H$_2$O. The mixture is stirred for 2 hours at ambient temperature, then the Teflon® jar in inserted into a sealed autoclave. The autoclave is placed in an oven at 140 C for 48 hours and rotated at 60 rpm. The autoclave is then removed from the oven and cooled to room temperature. The solids and mother liquors are then separated by centrifugation (or filtration). The solids are dried and weighed, and then characterized by X-ray diffraction (XRD).

Figure 3:
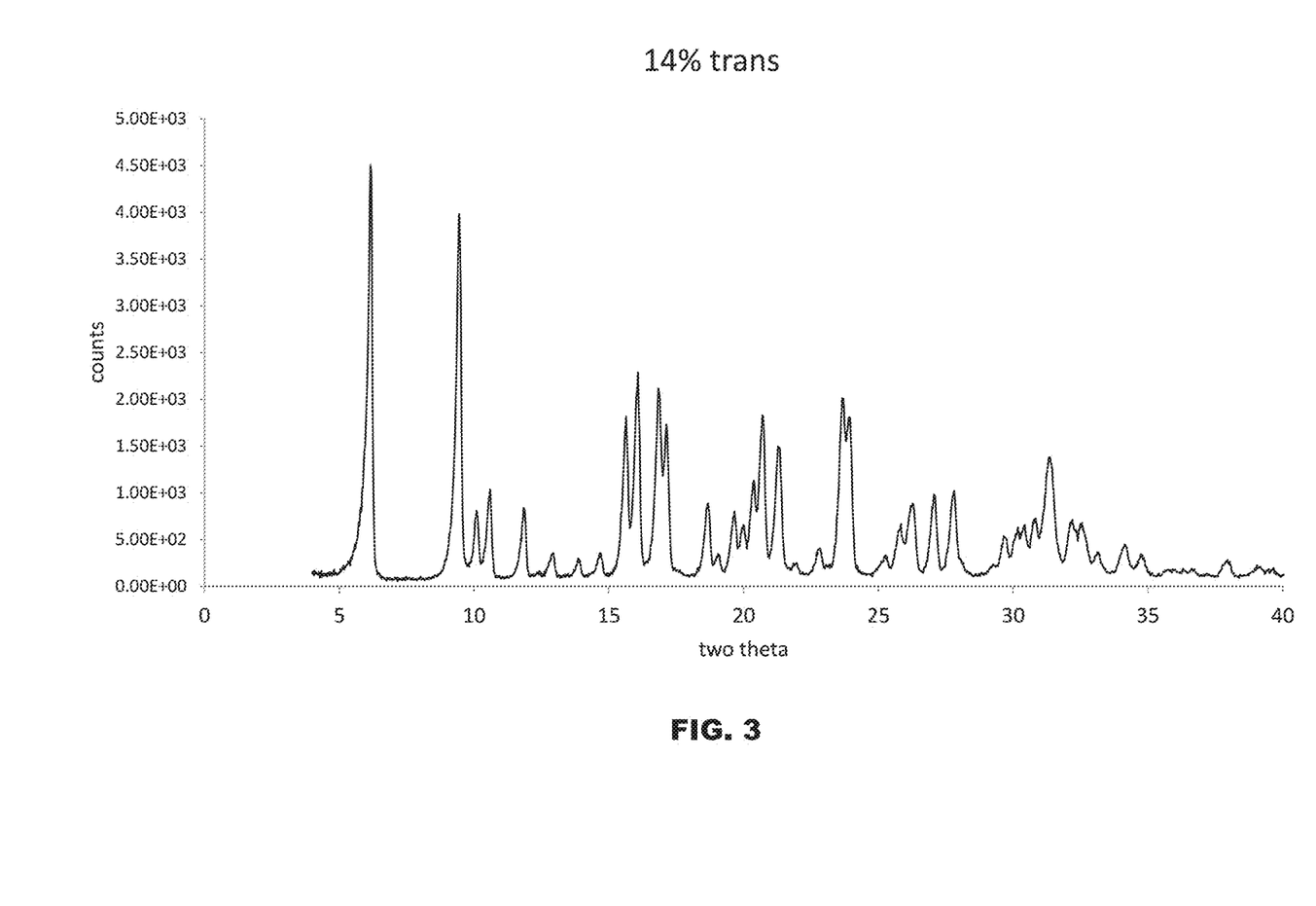
FIG. 3 is an X-ray diffraction scan for a product made in accordance with the prior art, containing about 14% trans isomer of the OSDA.

As in Zeolite Examples 1 and 2, the yield of the product zeolite SSZ-39 can be estimated by comparing the areas of the XRD peaks at 2 theta=9.5 (characteristic of SSZ-39) and 6.2 degrees (characteristic for faujasite), as shown in FIG. 3.

Zeolite Examples #4-7 (Si/Al=30)

To four 23 ml Teflon® jars is added: 4.33 g N grade sodium silicate (Na/Si ratio =3.21, PQ Corporation), 0.5 ml 1 M/l sodium hydroxide), 2.5 ml 98/2 cis/trans-N,N-dimethyl, 3,5 dimethylpiperidinium hydroxide (20%, Sachem, Inc.), 0.17 faujasite (e.g., CBV-500 SiO$_2$/Al$_2$O$_3$=5.2, Zeolyst Corp.) and 8.88 ml DI H$_2$O. Each of the mixtures are stirred for 2 hours at ambient temperature, then the Teflon® jars are inserted into sealed autoclaves. The autoclaves are placed in an oven at 140 C and rotated at 60 rpm. One autoclave is removed from the oven and cooled to room temperature after 12, 24, 36 and 72 hours. The solids and mother liquors are then separated by centrifugation (or filtration). The solids are dried and weighed, and then characterized by X-ray diffraction (XRD).

Zeolite Examples 8-11 (Si/Al=30)

The same preparations are performed as described above for Example 4-7, except that a 48/52 ratio of cis and trans isomers of N,N-dimethyl, 3,5 dimethylpiperidinium hydroxide is used instead of 98% cis isomer. The yields of the desired products are compared to those produced using the 98% cis isomer (Examples 4-6) and in each case the ratio of AEI to FAU in the XRD pattern is higher when using the higher trans composition.

The Si/Al ratios of the solids formed after 72 hours are 7.6 and 8.4 for examples 8 and 11, respectively. So the higher trans isomer content of the zeolite gel improves the Si/Al ratio closer to the commercially desirable level.

Zeolite Examples 12 and 13

To two 23 ml Teflon® jars is added: 3.835 g N grade sodium silicate (Na/Si ratio=3.21, PQ Corporation), 0.4 ml 1 M/l sodium hydroxide), 2.5 ml 71.8/28.2 cis/trans-N,N-dimethyl, 3,5 dimethylpiperidinium hydroxide (20%, Sachem, Inc.), 0.335 faujasite (e.g., CBV-500 SiO$_2$/Al$_2$O$_3$=5.2, Zeolyst Corp.) and 8.88 ml DI H$_2$O. The mixture is stirred for 2 hours at ambient temperature, then the Teflon® jar in inserted into a sealed autoclave. One autoclave is placed in an oven at 140 C for 23 hours and rotated at 25 rpm and then removed from the oven and cooled to room temperature. The other autoclave is placed in the oven for 41 hours. The solids and mother liquors are then separated by centrifugation (or filtration) and the mother liquors analyzed by HPLC to determine the isomeric ratios of the residual SDA present.

Zeolite Examples 14 and 15

To two 23 ml Teflon® jars is added: 3.835 g N grade sodium silicate (Na/Si ratio=3.21, PQ Corporation), 0.4 ml 1 M/l sodium hydroxide), 2.5 ml 84.8/15.2 cis/trans-N,N-dimethyl, 3,5 dimethylpiperidinium hydroxide (20%, Sachem, Inc.), 0.335 faujasite (e.g., CBV-500 $SiO_2$/$Al_2O_3$=5.2, Zeolyst Corp.) and 8.88 ml DI $H_2O$. The mixture is stirred for 2 hours at ambient temperature, then the Teflon® jar in inserted into a sealed autoclave. One autoclave is placed in an oven at 140 C for 26 hours and rotated at 25 rpm and then removed from the oven and cooled to room temperature. The other autoclave is placed in the oven for 42 hours. The solids and mother liquors are then separated by centrifugation (or filtration) and the mother liquors analyzed by HPLC to determine the isomeric ratios of the residual SDA present.

The results of examples 12-15 shown in Table 3 clearly show a preferential uptake of the trans isomer into the AEI zeolite product, resulting in a depletion of the trans isomer in the mother liquors. This is additional evidence for the favorability of the trans isomer in preparation of zeolites in accordance with the invention.

TABLE 3

| | % trans in mother liquors | |
|---|---|---|
| hours | Examples 14-15 | Examples 12-13 |
| 0 | 15.23 | 28.21 |
| 26 | 14.85 | |
| 42 | 14.1 | |
| 23 | | 26.05 |
| 41 | | 24.68 |

While the principles of the invention have been explained in relation to certain particular embodiments, which are provided for purposes of illustration, it is to be understood that various modifications thereof will become apparent to those skilled in the art upon reading the specification. Therefore, it is to be understood that the invention disclosed herein is intended to cover such modifications as fall within the scope of the appended claims. The scope of the invention is limited only by the scope of the appended claims.

The invention claimed is:

1. A method of preparing a SSZ-39 AEI zeolite, comprising:
    providing a precursor for 3,5-dimethyl-N,N-dimethylpiperidinium hydroxide;
    treating the precursor to provide an intermediate 3,5-dimethyl-N,N-dimethylpiperidinium salt that, when subsequently treated to form the 3,5-dimethyl-N,N-dimethylpiperidinium hydroxide, has a content of trans isomer of the 3,5-dimethyl-N,N-dimethylpiperidinium hydroxide in a range from greater than 25% up to 80% and a content of the cis isomer from less than 75% to 20%;
    contacting under crystallization conditions a mixture of sources of an oxide of silicon and faujasite, one or more alkali metal hydroxide or alkaline earth metal hydroxide, water, and a structure-directing agent comprising the 3,5-dimethyl-N,N -dimethylpiperidinium hydroxide having the content of the trans isomer of the 3,5-dimethyl-N,N-dimethylpiperidinium hydroxide in the range from greater than 25% up to 80% and a content of the cis isomer from less than 75% down to 20%; and
    calcining the mixture to form a SSZ-39 AEI zeolite,
    wherein the precursor is 3,5-dimethyl pyridine, or N-methyl-3,5-dimethylpiperidine, or 3,5-dimethylpiperidine.

2. The method of claim 1 wherein the treating comprises one or more of chemical reduction, non-catalytic hydrogenation, catalytic hydrogenation in the absence of water, selective crystallization, and distillation.

3. The method of claim 1 wherein the ratio of the trans isomer to the cis isomer of the 3,5-dimethyl-N,N-dimethylpiperidinium hydroxide is controlled by selective isolation of 3,5-dimethyl piperidine following hydrogenation of 3,5-dimethylpyridine, and subsequent methylation of the 3,5-dimethylpiperidene to form the 3,5-dimethyl-N,N-dimethylpiperidinium cation, which is subsequently paired with a hydroxide anion.

4. The method of claim 1 wherein the oxide of silicon is one or a combination of two or more of a silicate, a silica hydrogel, silicic acid, fumed silica, colloidal silica, a tetraalkyl orthosilicate, and a silica hydroxide.

5. The method of claim 1 wherein the contacting further comprises addition to the faujasite of one or a mixture of two or more of an aluminate, alumina, an aluminum colloid, aluminum oxide coated on silica sol, hydrated $Al(OH)_3$, $AlCl_3$ and $Al_2(SO_4)_3$.

6. The method of claim 1 wherein the precursor is 3,5-dimethyl pyridine, and the treating comprises a catalytic reduction to form a mixture of cis- and trans-3,5-dimethylpiperidine.

7. The method of claim 1 wherein the combining under crystallization conditions comprises stirring the mixture at room temperature, and the calcining comprises heating the mixture to an elevated temperature.

8. A method of making Cu-SSZ-39 AEI zeolite, comprising:
    (a) providing a SSZ-39 AEI zeolite made according to claim 1;
    (b) replacing at least a portion of alkali metal cation or alkaline earth metal cation remaining in the SSZ-39 AEI zeolite with a Cu+2 cation, to form Cu-SSZ-39 AEI zeolite.

* * * * *